(12) United States Patent
Ikegami et al.

(10) Patent No.: US 10,161,305 B2
(45) Date of Patent: Dec. 25, 2018

(54) TURBOCHARGER

(71) Applicants: Hiroaki Ikegami, Toyota (JP); Tsuyoshi Uesugi, Kariya (JP)

(72) Inventors: Hiroaki Ikegami, Toyota (JP); Tsuyoshi Uesugi, Kariya (JP)

(73) Assignees: Toyota Jidosha Kabushiki Kaisha, Toyota-shi, Aichi-ken (JP); Kabushiki Kaisha Toyota Jidoshokki, Kariya-shi, Aichi-ken (JP)

( * ) Notice: Subject to any disclaimer, the term of this patent is extended or adjusted under 35 U.S.C. 154(b) by 741 days.

(21) Appl. No.: 14/358,073

(22) PCT Filed: Nov. 13, 2012

(86) PCT No.: PCT/IB2012/002308
§ 371 (c)(1),
(2) Date: May 14, 2014

(87) PCT Pub. No.: WO2013/072732
PCT Pub. Date: May 23, 2013

(65) Prior Publication Data
US 2014/0321990 A1    Oct. 30, 2014

(30) Foreign Application Priority Data
Nov. 16, 2011    (JP) ................................. 2011-250914

(51) Int. Cl.
*F04D 29/08*    (2006.01)
*F02B 43/02*    (2006.01)
(Continued)

(52) U.S. Cl.
CPC ............ *F02B 43/02* (2013.01); *F01D 17/165* (2013.01); *F02C 6/12* (2013.01); *F05D 2220/40* (2013.01)

(58) Field of Classification Search
CPC .......... F01D 25/00; F01D 17/16; F01D 25/24; F04D 29/42; F02B 33/44; F02B 43/02; F02D 29/56
See application file for complete search history.

(56) References Cited

U.S. PATENT DOCUMENTS 5,964,574 A * 10/1999 Meier ..................... F01D 9/045
                                                        415/110
6,314,736 B1 * 11/2001 Daudel ................... F01D 11/00
                                                        415/148
(Continued)

FOREIGN PATENT DOCUMENTS

CN    101896704    11/2010
EP    2 226 484 A1    9/2010
(Continued)

*Primary Examiner* — Mark Laurenzi
*Assistant Examiner* — Shafiq Mian
(74) *Attorney, Agent, or Firm* — Finnegan, Henderson, Farabow, Garrett & Dunner, LLP

(57) ABSTRACT

A circular ring-shaped shroud plate is arranged between a scroll passage and a turbine chamber. The shroud plate has a through-hole that penetrates therethrough in a direction along an axis of a turbine shaft. A variable nozzle is supported in an openable/closable manner on the shroud plate by a shaft inserted through the through-hole. A gap between the shroud plate and a turbine housing in the direction along the axis is partitioned into a first space that communicates with an outlet of exhaust gas that faces the through-hole and is provided upstream of a turbine wheel with respect to the flow of exhaust gas, and a second space that communicates with the scroll passage, by a disc spring that is so arranged as to surround the turbine wheel.

3 Claims, 5 Drawing Sheets

(51) Int. Cl.
*F01D 17/16* (2006.01)
*F02C 6/12* (2006.01)

(56) References Cited

U.S. PATENT DOCUMENTS

| | | | | |
|---|---|---|---|---|
| 8,485,779 | B2* | 7/2013 | Matsuyama | F01D 17/165 415/164 |
| 2004/0081567 | A1* | 4/2004 | Boening | F01D 17/165 417/406 |
| 2006/0034684 | A1* | 2/2006 | Metz | F01D 11/003 415/191 |
| 2007/0172347 | A1* | 7/2007 | Battig | F01D 17/165 415/160 |
| 2007/0175216 | A1* | 8/2007 | Kobayashi | F01D 17/165 60/605.2 |
| 2010/0166541 | A1* | 7/2010 | Hausser | F01D 17/165 415/148 |
| 2010/0196146 | A1* | 8/2010 | Wengert | F01D 17/165 415/163 |
| 2010/0247296 | A1 | 9/2010 | Matsuyama | |
| 2010/0310363 | A1* | 12/2010 | Matsuyama | F01D 17/165 415/212.1 |
| 2013/0149129 | A1* | 6/2013 | Matsuyama | F01D 25/24 415/208.1 |
| 2013/0259661 | A1* | 10/2013 | Shudo | F01D 11/003 415/170.1 |
| 2014/0241858 | A1* | 8/2014 | Tashiro | F01D 11/005 415/111 |

FOREIGN PATENT DOCUMENTS

| | | | | |
|---|---|---|---|---|
| JP | 2009-144545 | | 7/2009 | |
| WO | WO 2011/105090 | | 9/2011 | |
| WO | WO 2011105090 A1 * | | 9/2011 | F01D 25/24 |

\* cited by examiner

TURBOCHARGER

BACKGROUND OF THE INVENTION

1. Field of the Invention

The invention relates to a turbocharger in which a variable nozzle mechanism that makes variable the flow velocity of exhaust gas blown onto a turbine wheel by causing a variable nozzle to operate in an opening/closing manner is incorporated.

2. Description of the Related Art

As a turbocharger that is mounted on an engine, there is a turbocharger in which a variable nozzle mechanism that makes variable the flow velocity of exhaust gas blown onto a turbine wheel by causing a variable nozzle to operate in an opening/closing manner is incorporated.

For example, in a turbocharger described in Japanese Patent Application Publication No. 2009-144545 (JP-2009-144545 A), as shown in FIG. 5, a turbine shaft 71 is rotatably supported by a bearing housing 72. A turbine housing 73 is arranged on one side of the bearing housing 72 (on the left side in FIG. 5) in a direction along an axis L1 of the turbine shaft 71. The turbine housing 73 has a turbine chamber 74 at a central portion thereof, and has a convolute scroll passage 75 around the turbine chamber 74. A turbine wheel 76 that rotates in the aforementioned turbine chamber 74 is provided on the turbine shaft 71. In addition, in this turbocharger 70, an exhaust gas E that has flowed along the scroll passage 75 after being discharged from an engine is blown onto the turbine wheel 76, and the turbine wheel 76 is rotationally driven. As a result of this, a compressor wheel (not shown) that is coaxial with the turbine wheel 76 rotates integrally with the turbine wheel 76, so that the engine is supercharged (intake air is compressed and delivered to the engine).

An annular support member 79 having a plurality of through-holes 78 that penetrate therethrough in the direction along the aforementioned axis L1 (a lateral direction in FIG. 5) is arranged in an annular communication passage 77 between the aforementioned scroll passage 75 and the aforementioned turbine chamber 74. Shafts 81 are turnably inserted through the through-holes 78 respectively, and variable nozzles 82 are fixed to the shafts 81 respectively. In addition, each of the variable nozzles 82 is operated in an opening/closing manner by being turned integrally with a corresponding one of the shafts 81. The flow velocity of the exhaust gas E that is blown onto the turbine wheel 76 is changed, the rotational speed of the turbocharger 70 is changed, and the boost pressure (the intake pressure) of the engine is adjusted.

An annular sealing member 83 is so arranged as to surround the turbine wheel 76, in a gap G between the support member 79 and the turbine housing 73, in the direction along the aforementioned axis L1. The aforementioned gap G is sealed upstream of the aforementioned through-holes 78 with respect to the flow of exhaust gas by this sealing member 83. Thus, the exhaust gas E in the scroll passage 75 is restrained from leaking out through the gap G.

However, in the turbocharger 70 described in the aforementioned Japanese Patent Application Publication No. 2009-144545 (JP-2009-144545 A), when the exhaust gas E leaks out to the gap G through between the through-holes 78 and the shafts 81 as indicated by an arrow in FIG. 5 in the process of passing through between adjacent ones of the variable nozzles 82 from the scroll passage 75, the exhaust gas E flows along the gap G downstream with respect to the flow of exhaust gas. In addition, this exhaust gas E is discharged from an outlet 84, which is located at a downstream end of the gap G downstream of the turbine wheel 76 with respect to the flow of exhaust gas, without passing the turbine wheel 76. Thus, the amount of the exhaust gas E that is blown onto the turbine wheel 76 decreases by an amount of the discharged exhaust gas. As a result, the rotational speed of the turbocharger 70 may become low, and the boost pressure of the engine may decrease.

SUMMARY OF THE INVENTION

The invention provides a turbocharger capable of restraining the boost pressure from decreasing as a result of exhaust gas that leaks out from between a through-hole and a shaft.

A turbocharger in accordance with a first aspect of the invention includes a turbine housing, a turbine wheel, an annular support member, a plurality of variable nozzles, and an annular sealing member. The turbine housing has a convolute scroll passage around a turbine chamber. The turbine wheel is provided on a turbine shaft, rotates in the turbine chamber, and is rotationally driven when exhaust gas that has flowed along the scroll passage after being discharged from an engine is blown thereonto. The annular support member is arranged between the scroll passage and the turbine chamber, and has through-holes, which penetrate in a direction along an axis of the turbine shaft, at a plurality of spots around the turbine wheel. The plurality of the variable nozzles are supported in an openable/closable manner on the support member by shafts inserted through the respective through-holes, and make variable a flow velocity of exhaust gas blown onto the turbine wheel through changes in opening degrees thereof. The annular sealing member is so arranged as to surround the turbine wheel, and partitions a gap between the support member and the turbine housing in the direction along the axis into a first space that communicates with an outlet of exhaust gas, which faces the through-holes and is provided upstream of the turbine wheel with respect to flow of exhaust gas, and a second space that communicates with the scroll passage.

According to the aforementioned configuration, in the turbocharger, exhaust gas that has flowed along the scroll passage of the turbine housing passes through between adjacent ones of the variable nozzles and is blown onto the turbine wheel in the turbine chamber, and the turbine wheel is rotationally driven. The variable nozzles are opened/closed with the shafts inserted through the through-holes of the support member serving as fulcrums, so that the opening degrees of the variable nozzles are changed. As a result of this, the flow velocity of exhaust gas that is blown onto the turbine wheel is changed, the rotational speed of the turbocharger is changed, and the boost pressure of the engine is adjusted.

In the aforementioned turbocharger, there is a gap between the support member and the turbine housing. However, this gap is sealed by the annular sealing member upstream of the aforementioned through-holes with respect to the flow of exhaust gas.

By the way, when exhaust gas leaks out to the gap through between the through-holes and the shafts in the process of passing through between adjacent ones of the variable nozzles, the exhaust gas flows downstream along the gap. This exhaust gas passes through an outlet of the aforementioned gap, and is returned upstream of the turbine wheel with respect to the flow of exhaust gas. This exhaust gas is blown onto the turbine wheel together with the exhaust gas that has passed through between the adjacent ones of the variable nozzles, and is devoted to rotationally driving the turbine wheel. In this manner, the exhaust gas that has temporarily leaked out from between the through-holes and the shafts is used to rotate the turbine wheel. Therefore, in comparison with a turbocharger in which exhaust gas is discharged downstream of a turbine wheel with respect to the flow of exhaust gas, the rotational speed of the turbocharger is less likely to decrease, and the boost pressure is further restrained from decreasing.

In the aforementioned configuration, a passage that establishes communication between the first space and operation ranges of the variable nozzles may be provided, and the outlet may be constituted by an opening region of the passage in the operation ranges.

According to the aforementioned configuration, the exhaust gas that has leaked out to the first space from between the through-holes and the shafts flows through the passage that establishes communication between the first space and the operation ranges of the variable nozzles. This exhaust gas passes through the opening region (the outlet) of the passage in the operation ranges, and flows to the operation ranges. Then, the aforementioned exhaust gas is blown onto the turbine wheel together with the exhaust gas that has passed through between adjacent ones of the variable nozzles.

In the aforementioned configuration, the turbine housing may be provided with a bulge portion that extends toward a side of a bearing housing that rotatably supports the turbine shaft and is located between the support member and the turbine wheel in a state of being spaced apart from the support member, and the passage may be constituted by a space between the support member and the bulge portion.

According to the aforementioned configuration, when exhaust gas leaks out to the first space through between the through-holes and the shafts in the process of passing through between the adjacent ones of the variable nozzles, the exhaust gas flows downstream along the gap. This exhaust gas passes through the passage between the support member and the bulge portion of the turbine wheel, and is thereby guided in the direction along the axis. Then, the exhaust gas flows from the outlet of the passage to the operation ranges of the variable nozzles.

In this manner, the space between the bulge portion and the support member is utilized as the aforementioned passage that establishes communication between the gap and the operation ranges. Therefore, it is unnecessary to provide the passage separately. In the aforementioned configuration, the turbocharger may further include an annular plate that is arranged opposite the support member across the variable nozzles and is integrally coupled to the support member. The sealing member may be constituted by a disc spring that is arranged in such a state as to surround the turbine wheel in the gap, and the disc spring may be in contact, at one of an outer peripheral edge portion thereof and an inner peripheral edge portion thereof, with the support member and in contact, at the other of the outer peripheral edge portion thereof and the inner peripheral edge portion thereof, with the turbine housing, in a state of being elastically deformed such that a dimension of the disc spring in the direction along the axis decreases, thereby urge the support member toward a side of a bearing housing that supports the turbine shaft, press the plate against the bearing housing, and partition the gap into the first space and the second space as the sealing member.

According to the aforementioned configuration, the disc spring urges the support member toward the side of the bearing housing through a spot where the disc member is in contact, on one of the outer peripheral edge portion thereof and the inner peripheral edge portion thereof, with the support member. As a result of this, the annular plate that is integrally coupled to the support member is also urged toward the same side, and is pressed against the bearing housing. Due to this pressing, the support member, the variable nozzles, and the plate are positioned in a floating state without being fixed to the bearing housing and the turbine housing.

Besides, one of the outer peripheral edge portion of the disc spring and the inner peripheral edge portion of the disc spring is in contact with the support member, and the other of the outer peripheral edge portion of the disc spring and the inner peripheral edge portion of the disc spring is in contact with the turbine housing, so that the gap is partitioned into the downstream space (the first space) that leads to the through-holes and the outlet, and the upstream space (the second space) that does not lead thereto. Thus, the exhaust gas that has directly flowed from the scroll passage into the space upstream of the gap is sealed by the disc spring, and is inhibited from leaking out to the downstream space. Besides, the exhaust gas that has leaked out to the downstream space from between the through-holes and the shafts is inhibited from flowing into the upstream space by the sealing member.

In this manner, a single member (the disc spring) serves both as an urging member that urges the support member and as the sealing member that seals the gap. Therefore, the number of parts of the turbocharger is smaller than in the case where the urging member and the sealing member are constituted by different members.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 2A is a lateral view as viewed from the left side of FIG. 1, and FIG. 2B is a lateral view as viewed from the right side of FIG. 1;

DETAILED DESCRIPTION OF EMBODIMENTS

Figure 1:
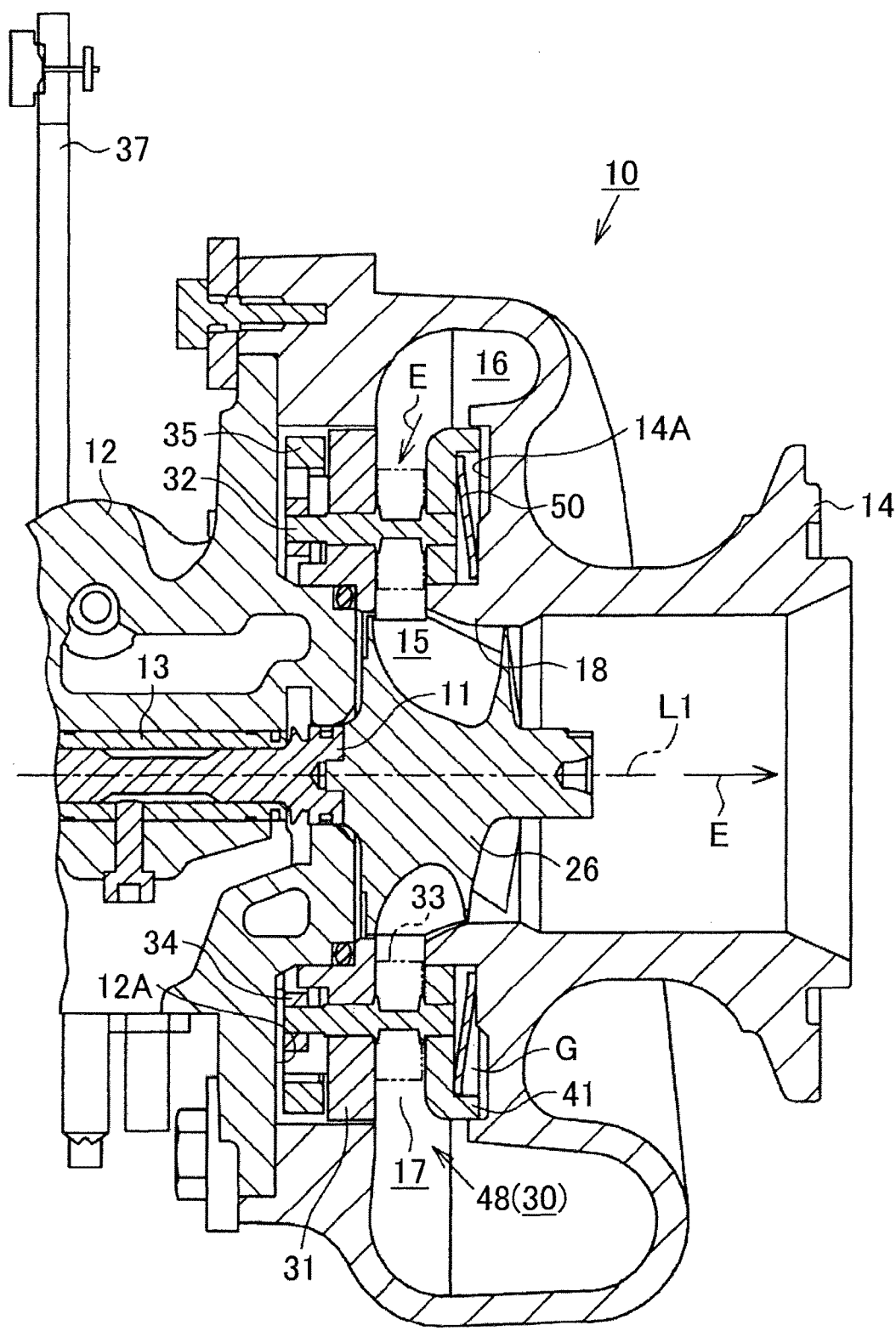
FIG. 1 is a view showing one embodiment of the invention, and is a partial cross-sectional view showing an overall configuration of a turbocharger in which a variable nozzle mechanism is incorporated.

One embodiment as a concrete form of the invention will be described hereinafter with reference to FIGS. 1 to 4. A vehicle is mounted with an engine that burns the mixture of air that is sucked into a combustion chamber through an intake passage, and fuel that is supplied to the combustion chamber. This engine is provided with a turbocharger 10 shown in FIG. 1. In this turbocharger 10, a turbine shaft 11 is rotatably supported on a bearing housing 12 by a bearing 13. A turbine housing 14 is adjacently arranged on one side of the bearing housing 12 (on the right side in FIG. 1) in a direction along an axis L1 of the turbine shaft 11 (hereinafter referred to as "an axial direction"). A compressor housing (not shown) composed of a plurality of members is adjacently arranged on the other side (on the left side in FIG. 1) of the bearing housing 12. The turbine housing 14 and the compressor housing are fastened to the bearing housing 12. In addition, this bearing housing 12, this turbine housing 14, and this compressor housing constitute a housing of the turbocharger 10.

A cylindrical turbine chamber 15 that extends in the aforementioned axial direction is formed at a central portion of the turbine housing 14. In the turbine housing 14, a convolute scroll passage 16 is formed around the turbine chamber 15. The turbine chamber 15 and the scroll passage 16 communicate with each other via a communication passage 17 (see FIG. 3).

Incidentally, an inner wall surface 12A that faces the communication passage 17 in the bearing housing 12, and an inner wall surface 14A that faces the communication passage 17 in the turbine housing 14 are perpendicular to or almost perpendicular to the aforementioned axis L1.

A turbine wheel 26 that rotates in the turbine chamber 15 is fixed on one end (on the right side in FIG. 1) of the turbine shaft 11. A compressor wheel (not shown) that rotates in the compressor housing is fixed on the other end (on the left side in FIG. 1) of the turbine shaft 11.

In addition, in the turbocharger 10 having the aforementioned basic configuration, an exhaust gas E that has flowed along the scroll passage 16 after being discharged from an engine is blown onto the turbine wheel 26 through the communication passage 17, so that the turbine wheel 26 is rotationally driven. This rotation is transmitted to the compressor wheel via the turbine shaft 11. As a result, in the engine, air that is sucked in through a negative pressure that is generated in the combustion chamber in accordance with the movement of a piston is forcibly delivered (supercharged) to the combustion chamber through the rotation of the compressor wheel of the turbocharger 10. In this manner, the efficiency of filling the combustion chamber with air is enhanced.

A variable nozzle mechanism 30 is incorporated in the aforementioned turbocharger 10. The variable nozzle mechanism 30 changes the exhaust gas flow area of the communication passage 17, and makes variable the flow velocity of the exhaust gas E that is blown onto the turbine wheel 26. The variable nozzle mechanism 30 is a mechanism for adjusting the rotational speed of the turbocharger 10 to adjust the amount of air that is forcibly delivered to the combustion chamber.

Figure 2A:
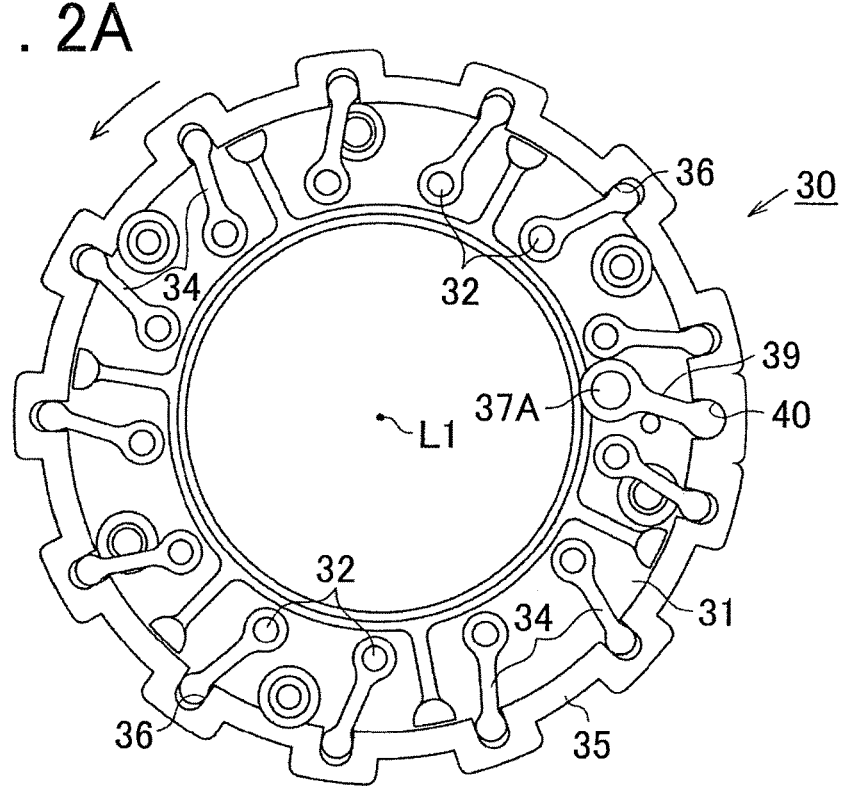
FIGS. 2A and 2B are views showing part of the variable nozzle mechanism in the embodiment of the invention.
Figure 2B:
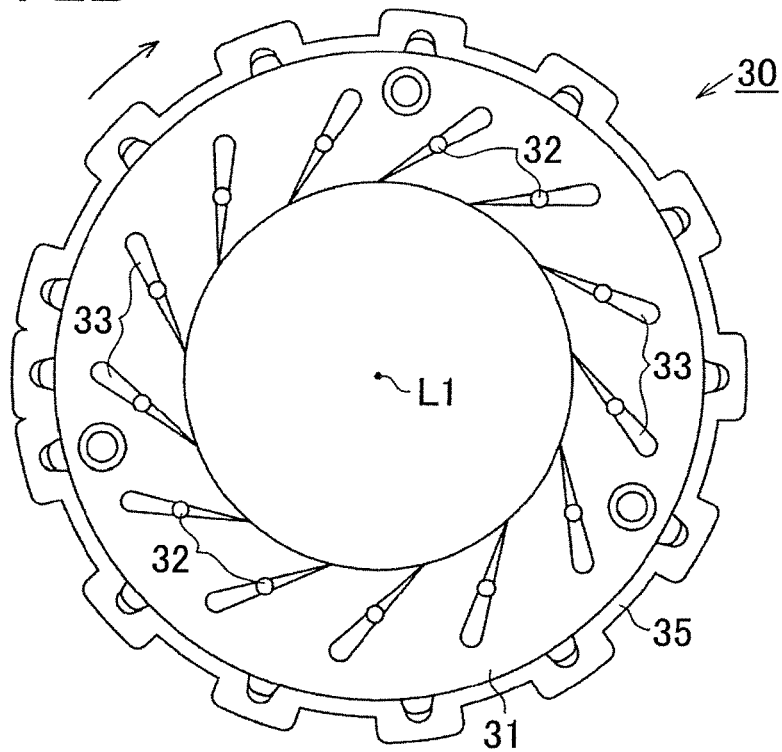

Next, the overall configuration of this variable nozzle mechanism 30 will be described. FIG. 2A shows part of the variable nozzle mechanism 30 (a nozzle plate 31 and the like) as viewed from the left side of FIG. 1, and FIG. 2B shows part of the variable nozzle mechanism 30 (the nozzle plate 31 and the like) as viewed from the right side of FIG. 1. As shown in FIGS. 1, 2A, and 2B, the variable nozzle mechanism 30 is equipped with the nozzle plate 31 and a unison ring 35, which are arranged in the communication passage 17. This nozzle plate 31 and this unison ring 35 assume the shape of a circular ring around the aforementioned axis L1. Besides, the nozzle plate 31 is also referred to simply as a plate.

On the nozzle plate 31, a plurality of shafts 32 are arranged substantially at equal angular intervals on the circle around the aforementioned axis L1. The respective shafts 32 extend parallel to the axis L1, and are turnably inserted through the nozzle plate 31. Each of variable nozzles (nozzle vanes) 33 is fixed to a corresponding one of the shafts 32 in one region thereof (on the right side in FIG. 1) that is exposed from the nozzle plate 31. In FIG. 1, one of the variable nozzles 33 is indicated by an alternate long and two short dashes line. Besides, a proximal end portion of each of arms 34 is fixed to a corresponding one of the shafts 32 at the other end thereof (on the left in FIG. 1) that is exposed from the nozzle plate 31.

The unison ring 35 has recess portions 36 at a plurality of spots on an inner peripheral face thereof. A distal end portion of each of the aforementioned arms 34 is engaged with a corresponding one of these recess portions 36. The unison ring 35 is rotated from the outside of the turbocharger 10 via a link 37 (see FIG. 1) or the like. That is, an arm 39 is fixed to a turning shaft 37A of the link 37, and a distal end portion of the arm 39 is engaged with a recess portion 40 that is provided in an inner peripheral face of the unison ring 35. In addition, when the unison ring 35 is turned around the aforementioned axis L1 via the link 37, the turning shaft 37A, the arm 39 and the like from outside the turbocharger 10, the respective arms 34 that are engaged with the plurality of the recess portions 36 of the unison ring 35 are turned (opened/closed) around the shafts 32 in a state of being synchronized with one another. Due to the turning of each of the shafts 32, the opening degree of a corresponding one of the variable nozzles 33 changes, and the aforementioned exhaust gas flow area of the communication passage 17 is changed. Then, the flow velocity of the exhaust gas E that is blown onto the turbine wheel 26 through between the adjacent ones of the variable nozzles 33 is adjusted.

For example, in FIG. 2A, when the arm 39 is turned counterclockwise by the link 37 or the like with the turning shaft 37A serving as a fulcrum, the unison ring 35 thereby turns in a direction indicated by each of arrows in FIGS. 2A and 2B. Due to the aforementioned turning of the unison ring 35, each of the shafts 32 turns counterclockwise in FIG. 2A, and turns clockwise in FIG. 2B. As a result of the aforementioned turning of each of the shafts 32, a corresponding one of the variable nozzles 33 turns to the closing side, and the flow velocity of the exhaust gas E that is blown onto the turbine wheel 26 becomes high. Contrary to the above, when the variable nozzles 33 turn to the opening side, the flow velocity of the exhaust gas E that is blown onto the turbine wheel 26 becomes low.

Figure 3:
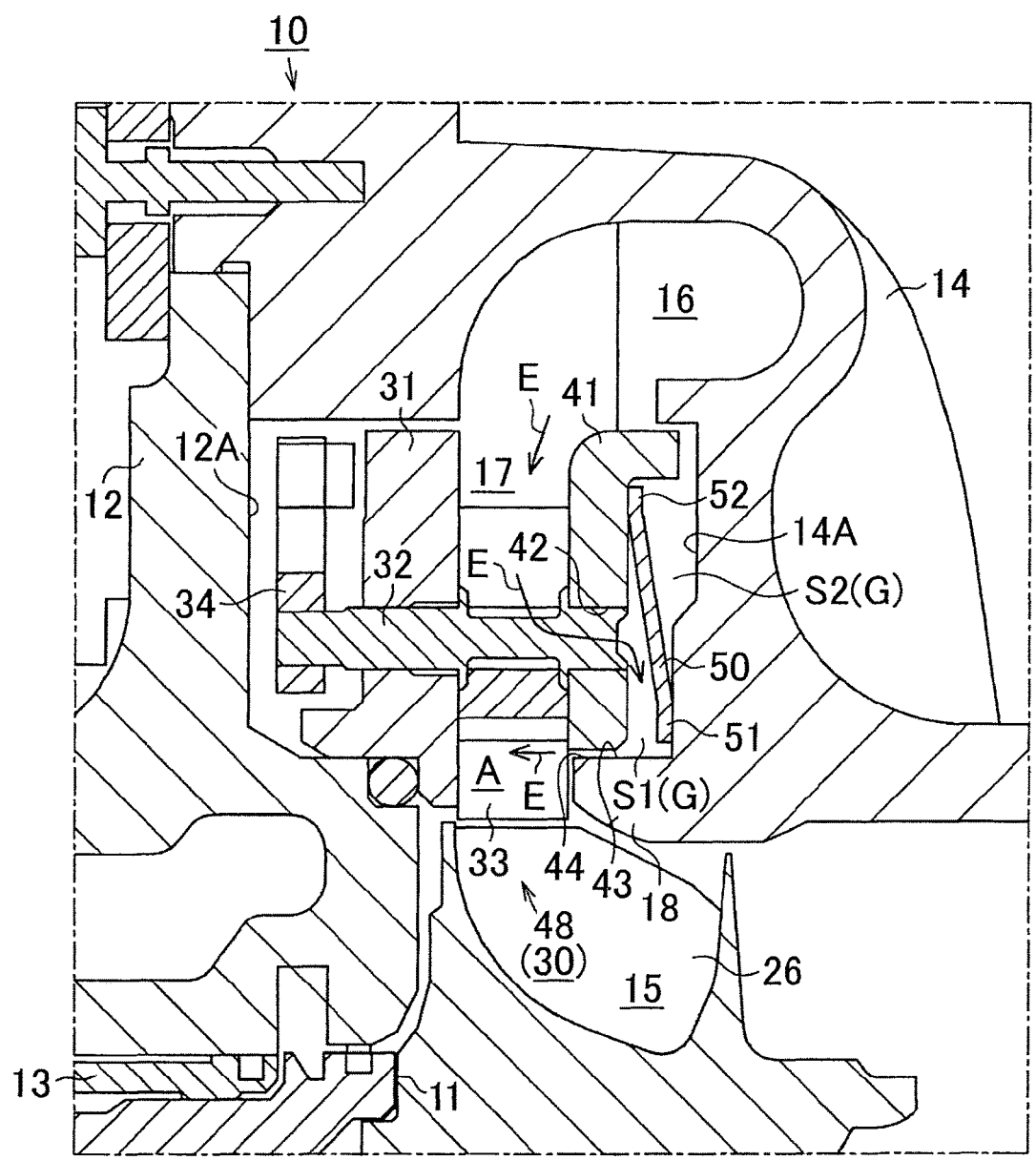
FIG. 3 is a partial cross-sectional view showing the variable nozzle mechanism of FIG. 1 and a peripheral region thereof on an enlarged scale.
Figure 4:
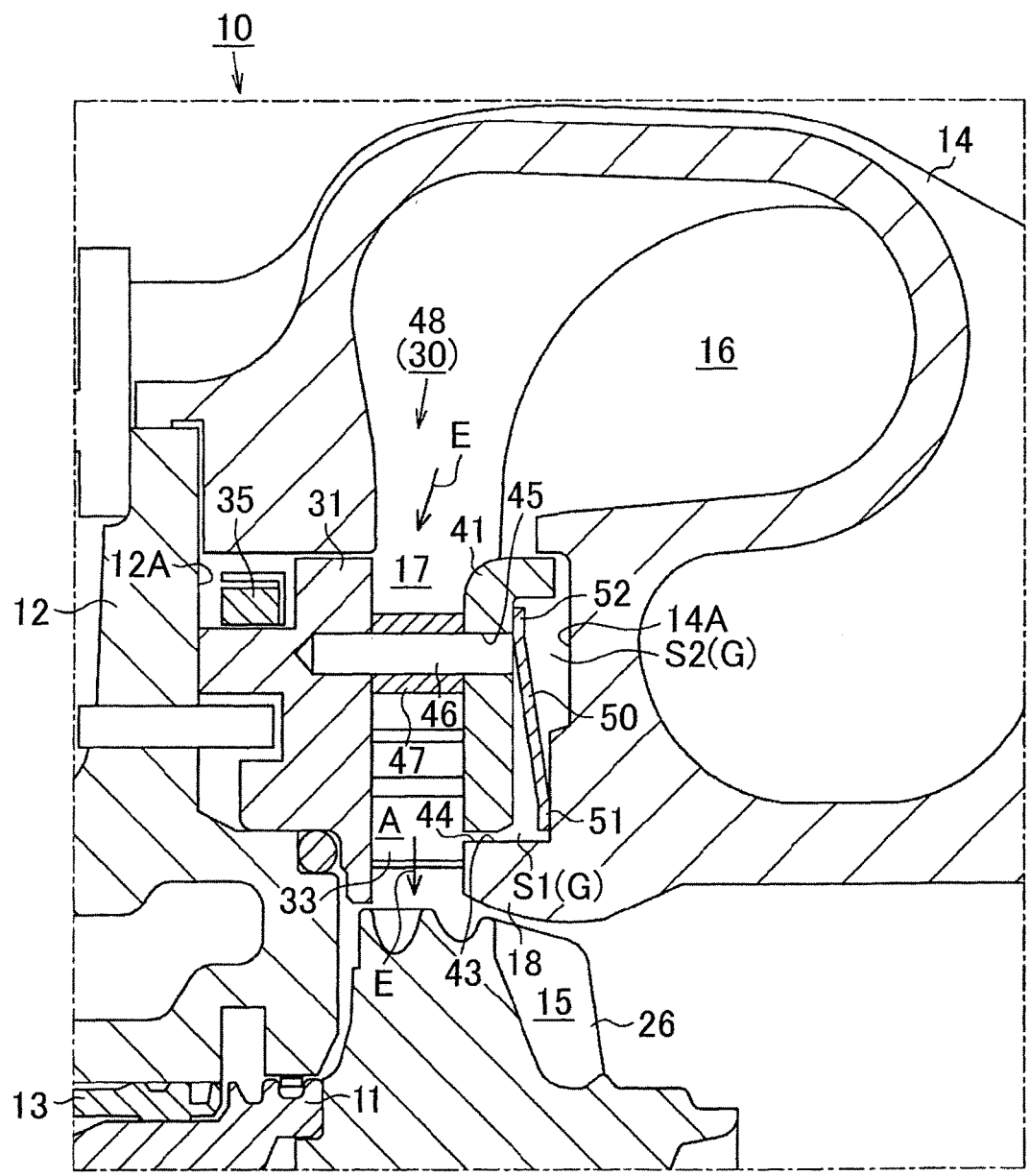
FIG. 4 is a partial cross-sectional view showing a cross-sectional structure of a cross-section that is different from those of FIGS. 1 and 3, as to the variable nozzle mechanism and the peripheral region thereof in the embodiment of the invention.
Figure 5:
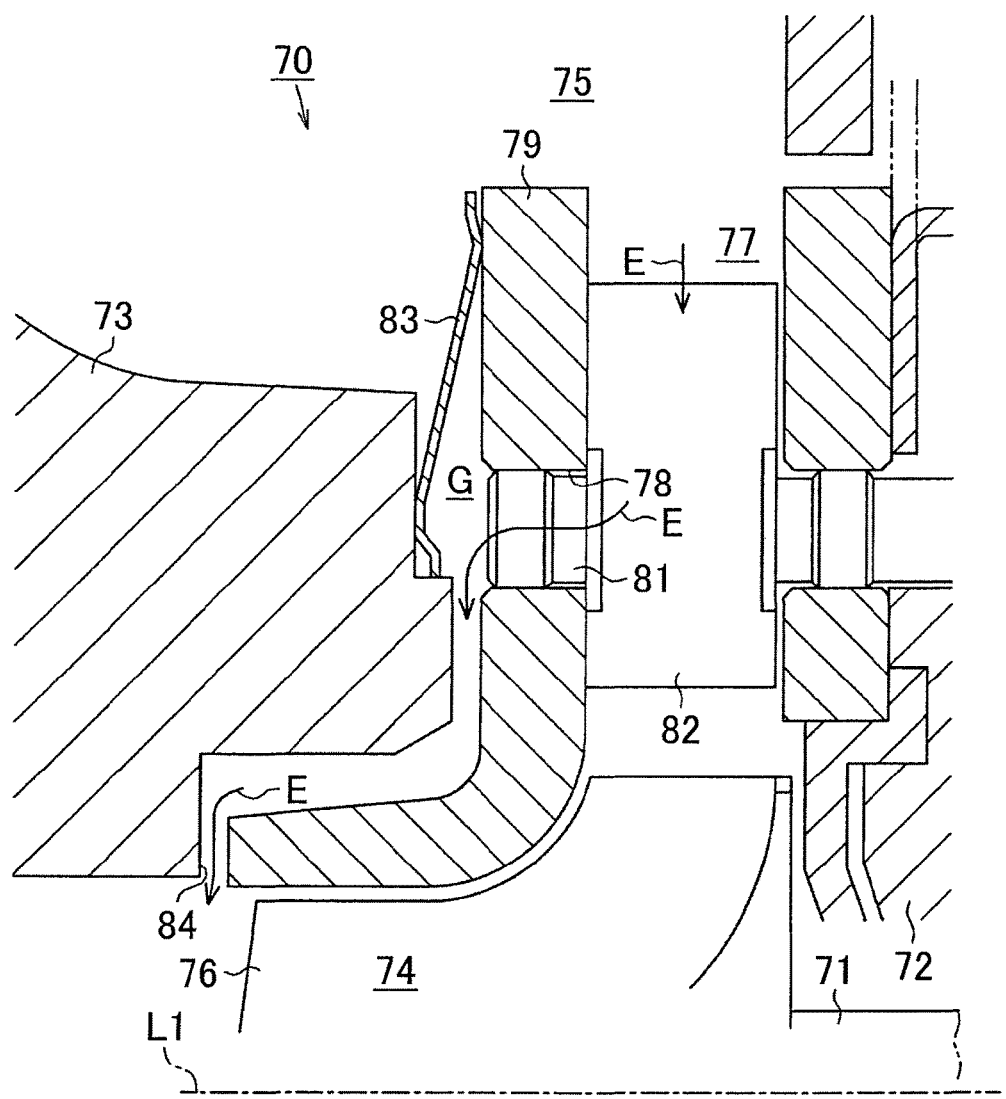
FIG. 5 is a partial cross-sectional view showing a variable nozzle mechanism and a peripheral region thereof in a conventional turbocharger on an enlarged scale.

FIG. 3 shows the variable nozzle mechanism 30 in FIG. 1 and a peripheral region thereof on an enlarged scale. Besides, FIG. 4 shows a cross-sectional structure of the variable nozzle mechanism 30 and the peripheral region thereof along a cross-section that is different from those of the aforementioned FIGS. 1 and 3 (a cross-section that extends past later-described spacers 47) on an enlarged scale. As shown in FIGS. 3 and 4, the variable nozzle mechanism 30 is equipped with a support member that is arranged in the aforementioned communication passage 17, in addition to the aforementioned configuration. This support member is constituted by a shroud plate 41 that assumes the shape of a circular ring around the aforementioned axis L1. The shroud plate 41 is arranged on such a side as to move away from the bearing housing 12 (on the right side of each of FIGS. 3 and 4) with respect to the nozzle plate 31. Through-holes 42 that penetrate in the axial direction are drilled through the shroud plate 41 at a plurality of spots on a circle around the aforementioned axis L1. On the other hand, each of the shafts 32 for a corresponding one of the variable nozzles 33 is exposed from the corresponding one of the variable nozzles 33 to the shroud plate 41 side. The exposed region of this shaft 32 is turnably inserted through a corresponding one of the aforementioned through-holes 42. Accordingly, each of the variable nozzles 33 is supported on the nozzle plate 31 and the shroud plate 41 in such a manner as to be capable of turning integrally with a corresponding one of the shafts 32.

The shroud plate 41 is coupled to the nozzle plate 31 by a plurality of pins 46 that are arranged at substantially equal angular intervals on the circle around the aforementioned axis L1. The diameter of this circle is larger than the diameter of the circle on which the plurality of the aforementioned shafts 32 are arranged. Accordingly, each of the pins 46 is located at a spot that is farther from the axis L1 than a corresponding one of the shafts 32. Each of the pins 46 is press-fitted in the nozzle plate 31, and is press-fitted in a corresponding one of holes 45 that are drilled in the shroud plate 41.

Each of the pins 46 is covered with a corresponding one of the circular tube-like spacers 47 between the nozzle plate 31 and the shroud plate 41. These spacers 47 ensure a gap that is as thick as the variable nozzles 33, between the nozzle plate 31 and the shroud plate 41. Due to the aforementioned coupling, the nozzle plate 31 and the shroud plate 41 are joined integrally with each other to constitute "an assembly body 48". In this assembly body 48, the range sandwiched by the nozzle plate 31 and the shroud plate 41 is a range (an operation range A) where each of the variable nozzles 33 turns (opens/closes) together with a corresponding one of the shafts 32.

Furthermore, in the turbocharger 10, a sealing member is arranged in a gap G between the shroud plate 41 of the assembly body 48 and the inner wall surface 14A of the turbine housing 14, around the turbine wheel 26. This sealing member is constituted by a disc spring 50 that is formed in the shape of a circular ring by an elastic body such as a metal plate or the like. This gap G is provided in consideration of, for example, the possibility of ensuring an installation space of the assembly body 48 between the bearing housing 12 and the turbine housing 14 even when the turbine housing 14 or the like is thermally deformed (contracted or expanded) during a transition between a cold state and a hot state, or even when the accuracies of component parts of the turbocharger 10 are dispersed.

The disc spring 50 seals the aforementioned gap G upstream of the through-holes 42 with respect to the flow of exhaust gas. Besides, the disc spring 50 also has the function of urging the assembly body 48 in the axial direction to press the assembly body 48 against the inner wall surface 12A of the bearing housing 12. The disc spring 50 is so formed in a conical (tapered) shape as to approach the inner wall surface 14A of the turbine housing 14 as the distance to a central portion of the disc spring 50 decreases.

An outer peripheral edge portion 52 of the disc spring 50 assumes the shape of a circular ring around the axis L1, and is in contact with the shroud plate 41 at a spot that is farther from the axis L1 than all the holes 45. As described above, each of the holes 45 is located at a spot that is farther from the axis L1 than a corresponding one of the through-holes 42. Therefore, the aforementioned outer peripheral edge portion 52 is in contact with the shroud plate 41 at a spot that is farther from the axis L1 than all the through-holes 42. An inner peripheral edge portion 51 of the disc spring 50 assumes the shape of a circular ring around the axis L1, and is in contact with the inner wall surface 14A of the turbine housing 14. In this case, the inner peripheral edge portion 51 is in contact with the inner wall surface 14A at a spot that is nearer to the turbine wheel 26 than all the through-holes 42.

Due to the application of a load to the aforementioned inner peripheral edge portion 51 and the aforementioned outer peripheral edge portion 52, the disc spring 50 is bent (elastically deformed) in such a direction that the dimension of the disc spring 50 in the axial direction thereof decreases. The disc spring 50 urges, at the outer peripheral edge portion 52 thereof, the assembly body 48 (the shroud plate 41) toward the bearing housing 12 side. Due to this urging, the nozzle plate 31 is pressed against the inner wall surface 12A of the bearing housing 12.

Furthermore, a bulge portion 18 that extends toward the bearing housing 12 side in a state of being slightly spaced apart from the shroud plate 41 toward the turbine wheel 26 side is formed integrally with the turbine housing 14. The bulge portion 18 assumes the shape of a circular ring around the axis L1, is located between the shroud plate 41 and the turbine wheel 26, and constitutes part of the inner wall surface of the aforementioned turbine chamber 15. In addition, a passage 43 that establishes communication between the gap G and the operation ranges A of the variable nozzles 33, namely, those regions of the variable nozzles 33 which are located downstream of the shafts 32 respectively with respect to the flow of exhaust gas is constituted by an annular space that extends parallel to the axis L1 between the shroud plate 41 and the bulge portion 18. A downstream end of this passage 43 (an opening region in the operation ranges A) constitutes an outlet 44 of the exhaust gas E in the gap G. Accordingly, the outlet 44 is located upstream of the turbine wheel 26 with respect to the flow of exhaust gas.

As described above, the turbocharger 10 in accordance with this embodiment of the invention is configured. Next, the operation of this turbocharger 10 will be described. The exhaust gas E that is generated through the operation of the engine flows into the turbocharger 10 in the process of flowing through an exhaust passage, and flows along the scroll passage 16 of the turbine housing 14. This exhaust gas E passes through between the adjacent ones of the variable nozzles 33, and is blown onto the turbine wheel 26 in the turbine chamber 15. Due to the blowing of this exhaust gas E, the turbine wheel 26 is rotationally driven. As a result of this, the compressor wheel that is coaxial with the turbine wheel 26 rotates integrally with the turbine wheel 26 to supercharge the engine.

The variable nozzles 33 are turned through the operation of the link 37 or the like from outside the turbocharger 10, and the opening degrees of the variable nozzles 33 are thereby changed. As a result of this, the flow velocity of the exhaust gas E that is blown onto the turbine wheel 26 is changed, the rotational speed of the turbocharger 10 is changed, and the boost pressure of the engine is adjusted.

It should be noted herein that although the aforementioned turbocharger 10 has the gap G between the shroud plate 41 and the turbine housing 14, this gap G is sealed by the disc spring 50 upstream of the aforementioned through-holes 42 with respect to the flow of exhaust gas. That is, in the turbocharger 10, between the assembly body 48 (the shroud plate 41) and the inner wall surface 14A of the turbine housing 14, the disc spring 50 is elastically deformed in the axial direction, and is incorporated with elastic energy accumulated therein.

The shroud plate 41 with which the outer peripheral edge portion 52 of the disc spring 50 is held in contact is constantly urged in the axial direction by forces that act to discharge elastic energy of the disc spring 50 (an elastic restoration force and an urging force). The urging force of this disc spring 50 is transmitted to the nozzle plate 31 via the spacers 47 and the pins 46. Due to the transmission of this urging force, the assembly body 48 is displaced toward the bearing housing 12 side, and part of the nozzle plate 31 is pressed against the inner wall surface 12A of the bearing housing 12. Due to this pressing, the assembly body 48 is positioned in a floating state without being fixed to both the housings 12 and 14.

Besides, the outer peripheral edge portion 52 of the disc spring 50 is in contact with the shroud plate 41 at a spot that is farther from the axis L1 than the through-holes 42, and the inner peripheral edge portion 51 of the disc spring 50 is in contact with the inner wall surface 14A of the turbine housing 14. The disc spring 50, which is in such a state of contact, partitions the gap G into a downstream space S1 that leads to the through-holes 42, the holes 45, and the passage 43 (the outlet 44), and an upstream space S2 that does not lead to the through-holes 42, the holes 45, and the passage 43 (the outlet 44). Thus, the exhaust gas E that has directly flowed from the scroll passage 16 into the upstream space S2 is sealed by the disc spring 50, and is inhibited from leaking out to the downstream space S1.

By the way, in order for each of the variable nozzles 33 to turn integrally with a corresponding one of the shafts 32, this corresponding one of the shafts 32 is turnably inserted through the corresponding one of the through-holes 42. Therefore, a sizable gap is created between each of the shafts 32 and an inner wall surface of a corresponding one of the through-holes 42. Thus, the exhaust gas E may leak out to the gap G (the space S1) through between the through-holes 42 and the shafts 32 in the process of passing through between the adjacent ones of the variable nozzles 33. This exhaust gas E flows downstream with respect to the flow of exhaust gas along the gap G (the space S1). The exhaust gas E flows through the passage 43 that establishes communication between the aforementioned gap G (the space S1) and the operation ranges A of the variable nozzles 33, downstream of the shafts 32 with respect to the flow of exhaust gas. This exhaust gas E is guided to the operation ranges A through the opening region (the outlet 44) of the passage 43 in the operation ranges A, and is returned upstream of the turbine wheel 26 with respect to the flow of exhaust gas. This exhaust gas E is blown onto the turbine wheel 26 together with the exhaust gas E that has passed through the adjacent ones of the variable nozzles 33, and is devoted to rotationally driving the turbine wheel 26.

According to the embodiment of the invention described above in detail, the following effects are obtained. (1) In the turbocharger 10 in which the variable nozzle mechanism 30 is incorporated and the disc spring 50 is arranged as a sealing member in the gap G between the shroud plate 41 of the assembly body 48 and the inner wall surface 14A of the turbine housing 14, the outlet 44 of the exhaust gas E in the gap G is provided upstream of the turbine wheel 26 with respect to the flow of exhaust gas.

Thus, even when the exhaust gas E temporarily leaks out to the gap G (the space S1) from between the shafts 32 and the through-holes 42 of the shroud plate 41 that supports the variable nozzles 33 in the variable nozzle mechanism 30, the exhaust gas E can be returned from the outlet 44 upstream of the turbine wheel 26 with respect to the flow of exhaust gas, and can be used to rotate the turbine wheel 26. As a result, the rotational speed of the turbocharger 10 is made less likely to decrease, and the boost pressure can be more restrained from decreasing, in comparison with a turbocharger in which the exhaust gas E is discharged downstream of the turbine wheel 26 with respect to the flow of exhaust gas (Japanese Patent Application Publication No. 2009-144545 (JP-2009-144545 A)).

(2) The passage 43 that establishes communication between the gap G and the operation ranges A of the variable nozzles 33 is provided, and the opening region of this passage 43 in the operation ranges A serves as the outlet 44. Thus, the exhaust gas E that has leaked out to the gap G (the space S1) from between the through-holes 42 and the shafts 32 is guided to the sides of the operation ranges A of the variable nozzles 33 by the passage 43, and is caused to flow to the operation ranges A from the outlet 44. The exhaust gas E can thereby be returned upstream of the turbine wheel 26 with respect to the flow of exhaust gas.

(3) The turbine housing 14 is provided with the bulge portion 18 that extends toward the bearing housing 12 side and is located between the shroud plate 41 and the turbine wheel 26 in a state of being spaced apart from the shroud plate 41, and the passage 43 is constituted by the annular space between the shroud plate 41 and the bulge portion 18.

Thus, the exhaust gas E that has leaked out to the gap G (the space S1) through between the through-holes 42 and the shafts 32 can be guided to the sides of the operation ranges A of the variable nozzles 33 by the passage 43 between the shroud plate 41 and the bulge portion 18, and can be caused to flow from the outlet 44 to the operation ranges A.

In this manner, the space between the bulge portion 18 and the shroud plate 41 is utilized as the passage 43 that establishes communication between the gap G and the operation ranges A. Therefore, there is no need to provide the passage 43 separately.

Besides, the shroud plate 41 is separated from the turbine housing 14 (the bulge portion 18). Therefore, even when the turbine housing 14 is deformed through heat or the like, the influence of the deformation can be prevented or restrained from being exerted on the shroud plate 41.

(4) The annular nozzle plate 31 is arranged opposite the shroud plate 41 across the variable nozzles 33, and the shroud plate 41 is joined integrally with the nozzle plate 31 by the pins 46 and the spacers 47. In the gap G, the disc spring 50 is arranged in a state of surrounding the turbine wheel 26. With the disc spring 50 elastically deformed such that the dimension thereof in the direction along the axis L1 decreases, the outer peripheral edge portion 52 of the disc spring 50 is held in contact with the shroud plate 41, and the inner peripheral edge portion 51 of the disc spring 50 is held in contact with the inner wall surface 14A of the turbine housing 14.

Thus, the shroud plate 41 can be urged by the disc spring 50, the nozzle plate 31 can be pressed against the inner wall surface 12A of the bearing housing 12, and the assembly body 48 can be positioned in a floating state without being fixed to the bearing housing 12 and the turbine housing 14.

Besides, the gap G is partitioned by the disc spring 50 into the downstream space S1 that leads to the through-holes 42 and the outlet 44, and the upstream space S2 that does not lead to the through-holes 42 and the outlet 44. Thus, the exhaust gas E that has directly flowed from the scroll passage 16 into the upstream space S2 is sealed by the disc spring 50, and can be inhibited from leaking out to the downstream space S1. Besides, the exhaust gas E that has leaked out to the downstream space S1 from between the through-holes 42 and the shafts 32 can be inhibited from flowing into the upstream space S2 by the disc spring 50.

In this manner, the single member (the disc spring 50) serves both as an urging member that urges the shroud plate 41 and as a sealing member that seals the gap G. Therefore, the number of parts of the turbocharger 10 can be made smaller than in the case where the urging member and the sealing member are constituted by different members.

(5) The outer peripheral edge portion 52 of the disc spring 50 is held in contact with the shroud plate 41 at a spot that is farther from the axis L1 than the holes 45 of all the pins 46. Thus, even when the exhaust gas E that flows between the adjacent ones of the variable nozzles 33 leaks out to the gap G from between the holes 45 of the shroud plate 41 and the pins 46, it is possible to return the exhaust gas E from the outlet 44 upstream of the turbine wheel 26 with respect to the flow of exhaust gas, and use the exhaust gas E to rotate the turbine wheel 26. As a result, the rotational speed of the turbocharger 10 can be made less likely to decrease, and the boost pressure can be further restrained from decreasing.

(6) Through the urging force of the disc spring 50 alone, the assembly body 48 of the variable nozzle mechanism 30 is positioned by being pressed against the bearing housing 12. Thus, the assembly body 48 can be configured in a relatively small size, the temperature differences among the component parts of the assembly body 48 can be reduced, and the degree of thermal deformation at high temperatures can be reduced.

Besides, the assembly body 48 is not forcibly fixed on the outer diameter side of the nozzle plate 31 or the like. Therefore, the restriction on deformation can be reduced, and the degree of thermal deformation can be reduced. In view of these facts, even when the clearance between the nozzle plate 31 and the variable nozzles 33 or the clearance between the shroud plate 41 and the variable nozzles 33 is reduced, the stiffening or the like of the variable nozzles 33 at high temperatures is avoided. The stiffening of the variable nozzles 33 is a phenomenon that the variable nozzles 33 become unlikely to move or immovable through contact with the nozzle plate 31 and the shroud plate 41 when turning (opening/closing). As a result, the turbo performance can be improved. That is, the turbine efficiency can be enhanced.

Incidentally, the invention can be embodied into other embodiments thereof, which will be described below. The outlet 44 of the exhaust gas E in the gap G may be provided at a spot that is different from the spot of the foregoing embodiment of the invention, on the condition that the outlet 44 be located upstream of the turbine wheel 26 with respect to the flow of exhaust gas. This spot may be a spot that is located more upstream with respect to the flow of exhaust gas and nearer to the shafts 32 than in the foregoing embodiment of the invention. Besides, this spot may be located upstream of the shafts 32 with respect to the flow of exhaust gas.

The shroud plate 41 may be arranged in contact with the bulge portion 18. In addition, the passage 43 having the outlet 44 may be provided in a boundary region between the shroud plate 41 and the bulge portion 18.

The shroud plate 41 in the foregoing embodiment of the invention may be provided with the passage 43 having the outlet 44. The bulge portion 18 may be provided integrally with the shroud plate 41 instead of being provided integrally with the turbine housing 14, and the shroud plate 41 having this bulge portion 18 may be provided with the passage 43 having the outlet 44.

The bulge portion 18 may be provided with the passage 43 having the outlet 44. The passage 43 may not necessarily be provided parallel to the axis L1, but may be provided inclined with respect to the axis L1.

The passage 43 may not necessarily be annular. Passages 43 may be provided on the circle around the axis L1 at a plurality of spots that are spaced apart from one another in the circumferential direction. Contrary to the foregoing embodiment of the invention, the disc spring 50 may be held in contact, at the inner peripheral edge portion 51 thereof, with the shroud plate 41, and may be held in contact, at the outer peripheral edge portion 52 thereof, with the inner wall surface 14A of the turbine housing 14. In this case, however, the inner peripheral edge portion 51 of the disc spring 50 is held in contact with the shroud plate 41 upstream of the through-holes 42 with respect to the flow of exhaust gas.

The disc spring 50 needs to be held in contact with the shroud plate 41 upstream of the through-holes 42 with respect to the flow of exhaust gas. However, the disc spring 50 may be held in contact with the turbine housing 14 at any spot thereof. For example, the disc spring 50 may be held in contact with the turbine housing 14 upstream of the through-holes 42 with respect to the flow of exhaust gas.

In the case where the amount of the exhaust gas E that flows from between the pins 46 and the holes 45 is negligibly small, the disc spring 50 may be held in contact with the shroud plate 41 downstream of the holes 45 (but upstream of the through-holes 42) with respect to the flow of exhaust gas.

The sealing member may be constituted by a member other than the member that urges the assembly body 48 of the variable nozzle mechanism 30. For example, the sealing member may be constituted by a gasket instead of being constituted by the disc spring.

The invention claimed is:

1. A turbocharger comprising:
a turbine housing that has a convolute scroll passage around a turbine chamber;
a turbine wheel provided on a turbine shaft, the turbine wheel rotating in the turbine chamber and being rotationally driven when exhaust gas that has flowed along the scroll passage after being discharged from an engine is blown onto the turbine wheel;
an annular support member arranged between the scroll passage and the turbine chamber, the annular support member having through-holes at a plurality of spots around the turbine wheel, the through-holes penetrating in a direction along an axis of the turbine shaft;
a plurality of variable nozzles that are openable and closeable, the variable nozzles being supported on the support member by shafts inserted through the respective through-holes, and making variable a flow velocity of exhaust gas blown onto the turbine wheel through changes in opening degrees of the variable nozzles; and
an annular sealing member arranged so as to surround the turbine wheel, the annular sealing member partitioning a gap between the support member and the turbine housing in the direction along the axis into a first space communicating with an outlet of exhaust gas, the annular sealing member facing the through-holes and being provided upstream of the turbine wheel with respect to flow of exhaust gas, wherein exhaust gas passing through the outlet is blown onto the turbine wheel to rotationally drive the turbine wheel, and a second space communicating with the scroll passage, and
wherein the turbocharger further includes a flow path conveying exhaust gas from the through-holes to a portion upstream of the turbine wheel such that exhaust gas flowing through the flow path is used to rotationally drive the turbine wheel, the flow path including a passage establishing communication between the first space and operational ranges of the variable nozzles where each of the plurality of variable nozzles turns together with a corresponding one of the shafts, the operational ranges of the variable nozzles including regions of the variable nozzles located downstream of the shafts with respect to the flow of exhaust gas where each of the variable nozzles turns together with a corresponding one of the shafts, and wherein at least one of the variable nozzles is configured to extend past the outlet and to reach a bulge portion of the turbine housing towards the turbine chamber.

2. The turbocharger according to claim 1, wherein the bulge portion extends toward a side of a bearing housing, the bearing house rotatably supports the turbine shaft and is located between the support member and the turbine wheel in a state of being spaced apart from the support member, and the passage is constituted by a space between the support member and the bulge portion.

3. The turbocharger according to claim 1, further comprising:

an annular plate that is arranged opposite the support member across the variable nozzle, the annular plate being integrally coupled to the support member, wherein the sealing member is constituted by a disc spring, the disc spring is arranged so as to surround the turbine wheel in the gap, the disc spring is in contact with the support member at one of an outer peripheral edge portion of the disc spring and an inner peripheral edge portion of the disc spring, and the disc spring is in contact with the turbine housing, at the outer peripheral edge portion of the disc spring and the inner peripheral edge portion of the disc spring, wherein the disc spring is in an elastically deformed state such that a dimension of the disc spring in the direction along the axis decreases, the disc spring urges the support member toward a side of a bearing housing that supports the turbine shaft, presses the annular plate against the bearing housing, and partitions the gap into the first space and the second space.

* * * * *